US009031855B2

(12) United States Patent
Ohmura et al.

(10) Patent No.: US 9,031,855 B2
(45) Date of Patent: May 12, 2015

(54) TELECONFERENCE SUPPORT SYSTEM

(75) Inventors: Keiji Ohmura, Yokohama (JP); Takako Hashimoto, Tokyo (JP); Tadashi Araki, Kawasaki (JP); Yuuji Kasuya, Yokohama (JP)

(73) Assignee: Ricoh Company, Ltd., Tokyo (JP)

(*) Notice: Subject to any disclaimer, the term of this patent is extended or adjusted under 35 U.S.C. 154(b) by 567 days.

(21) Appl. No.: 12/816,715

(22) Filed: Jun. 16, 2010

(65) Prior Publication Data
US 2010/0324946 A1 Dec. 23, 2010

(30) Foreign Application Priority Data

Jun. 22, 2009 (JP) ................................. 2009-147566

(51) Int. Cl.
*G06Q 10/00* (2012.01)
*H04N 7/15* (2006.01)
*G06Q 10/02* (2012.01)
*G06Q 10/06* (2012.01)
*H04L 12/18* (2006.01)
*H04M 3/38* (2006.01)
(Continued)

(52) U.S. Cl.
CPC ................. *H04N 7/15* (2013.01); *G06Q 10/02* (2013.01); *G06Q 10/06* (2013.01); *H04L 12/1818* (2013.01); *H04M 3/387* (2013.01); *H04M 3/56* (2013.01); *H04M 2201/18* (2013.01); *H04N 21/42203* (2013.01); *H04N 21/4223* (2013.01); *H04N 21/4788* (2013.01)

(58) Field of Classification Search
CPC ............................... G06Q 10/02; G06Q 10/06
See application file for complete search history.

(56) References Cited

U.S. PATENT DOCUMENTS 6,480,885 B1 * 11/2002 Olivier .......................... 709/207
2006/0106780 A1 * 5/2006 Dagan .............................. 707/3
(Continued)

FOREIGN PATENT DOCUMENTS

JP            9-91341 A      4/1997
JP        2004-129071 A      4/2004
(Continued)

OTHER PUBLICATIONS

Japanese Office Action issued May 28, 2013 in Patent Application No. 2009-147566.

*Primary Examiner* — George Chen
(74) *Attorney, Agent, or Firm* — Oblon, McClelland, Maier & Neustadt, L.L.P.

(57) ABSTRACT

A teleconference support system, establishing a teleconference among conference rooms, includes teleconference apparatuses, and a connection server including a conference venue information storage, a conference start judgment unit, and a teleconference apparatus connection unit. Each teleconference apparatus, disposed in each conference room, is provided with an image taking unit, a sound taking unit, a display unit, and an audio output unit. The connection server connects the teleconference apparatuses to transmit and receive information among the conference rooms. Each teleconference apparatus includes a person identification information acquisition unit to obtain person identification information identifying individual. The conference venue information storage stores conference information including person identification information of expected teleconference participant. The conference start judgment unit determines whether each teleconference satisfies a conference start condition using the person identification information. The teleconference apparatus connection unit connects teleconference apparatuses when the teleconference is determined to satisfy the conference start condition.

18 Claims, 7 Drawing Sheets

(51) Int. Cl.
*H04M 3/56* (2006.01)
*H04N 21/422* (2011.01)
*H04N 21/4223* (2011.01)
*H04N 21/4788* (2011.01)

(56) References Cited

U.S. PATENT DOCUMENTS

2007/0285504 A1* 12/2007 Hesse ......................... 348/14.08
2009/0016512 A1* 1/2009 Bryant et al. ............ 379/202.01
2009/0210491 A1* 8/2009 Thakkar et al. ................ 709/204
2009/0326979 A1* 12/2009 Ryan ................................. 705/2
2012/0016700 A1* 1/2012 Jabbour et al. .................... 705/5

FOREIGN PATENT DOCUMENTS

| JP | 2005-190317 A | 7/2005 |
| JP | 2006-119784 A | 5/2006 |
| JP | 2006-146415 | 6/2006 |
| JP | 2006-253775 | 9/2006 |

* cited by examiner

FIG. 5

CONFERENCE INFORMATION

| CONFERENCE ID | START DATE/TIME | FINISH DATE/TIME | CONFERENCE ROOMS | PARTICIPANTS CONDITION | EXPECTED PARTICIPANTS | PRIORITY LEVEL |
|---|---|---|---|---|---|---|
| ... | ... | ... | ... | ... | ... | ... |
| 151 | 2009/3/9 14:00 | 2009/3/9 15:00 | 2a | ALL | A-1 | |
| | | | | | A-2 | |
| | | | | | A-3 | |
| | | | 2b | 50% OR MORE | B-1 | |
| | | | | | B-2 | |
| | | | | | B-3 | |
| 152 | 2009/3/9 14:40 | 2009/3/9 16:00 | 2c | ALL EXPECTED PARTICIPANTS HAVING HIGHER PRIORITY LEVEL | C-1 | ○ |
| | | | | | C-2 | ○ |
| | | | | | C-3 | |
| | | | 2d | ONE OR MORE | D-1 | ○ |
| | | | | | D-2 | |
| | | | 2e | ALL | E-1 | ○ |
| | | | | | E-2 | |
| ... | ... | ... | ... | ... | ... | ... |

CONFERENCE HISTORY INFORMATION

| CONFERENCE ID | START DATE/TIME | PARTICIPATED PARTICIPANTS |
|---|---|---|
| ⋮ | ⋮ | ⋮ |
| 151 | 2009/3/9 14:00 | A-1 |
| | | A-2 |
| | | A-3 |
| | | A-4 |
| | | B-1 |
| | | B-2 |
| | | B-3 |
| 152 | 2009/3/9 14:40 | C-1 |
| | | C-2 |
| | | D-1 |
| | | E-1 |
| | | E-2 |
| ⋮ | ⋮ | ⋮ |

# TELECONFERENCE SUPPORT SYSTEM

CROSS-REFERENCE TO RELATED APPLICATIONS

This application claims priority to Japanese Patent Application No. 2009-147566, filed on Jun. 22, 2009 in the Japan Patent Office, which is hereby incorporated by reference herein in its entirety.

BACKGROUND OF THE INVENTION

1. Field of the Invention

The present invention relates to a teleconference support system, and more particularly, to a teleconference support system for teleconferencing among a plurality of conference rooms.

2. Description of the Background Art

Teleconferences, which establish communication between a plurality of physically widely separated conference rooms remote from each other, may use telephone lines or the internet to connect the conference rooms. In such teleconferences, a video camera set in each of the conference rooms takes visual information, and then the visual information is distributed to other conference rooms in real time, enabling visual information of one conference room to be shared by other conference rooms.

Typically, information on the conference rooms to be used for a planned teleconference can be reserved and registered in advance in a server together with conference information such as conference starting time, using a web browser or the like. When the conference starting time has come, the reserved conference rooms can be automatically connected to each other by the server.

However, in the conventional method, conference rooms may be automatically connected with each other when the time becomes the conference starting time without consideration of actual conditions in the conference rooms. For example, some of the reserved conference rooms may not be ready for starting a teleconference, or a person different from the expected participant(s) may be present in the conference room at the starting time.

Accordingly, JP-2006-253775-A discloses a teleconference system in which the actual entrance of one conference participant (e.g., the conference session initiator, or moderator) in a given room is confirmed by another conference participant in another room, who receives a given signal from the moderator. For example, such teleconference system may include a communication unit to conduct a session for establishing communication between the moderator in one room and other participants in other rooms, a transmission/reception unit to transmit and receive audio information and video information, an output unit to output video received by the transmission/reception unit, and a control unit to control the transmission/reception unit not to start communication until a communication start instruction is received after establishing the session.

A drawback of the above-described approach is that users are required to start a teleconference even when the teleconference system is actually already ready for starting a teleconference. For example, users may be required to perform tasks such as conference initiation calling by one participant, recognition of conference initiation call by other participant(s), and a communication start instruction by other participant(s) who have received the conference initiation call. This approach is cumbersome, and as such, the teleconference may not be started until such user task is done.

SUMMARY

In one aspect of the present invention, a teleconference support system used for establishing a teleconference among a plurality of conference rooms is devised. The teleconference support system includes a plurality of teleconference apparatuses, and a connection server. Each of the plurality of teleconference apparatuses is disposed in each of the conference rooms and provided with an image taking unit to take visual information in each of the conference room, a sound taking unit to take audio and sound information in each of the conference room, a display unit, and an audio output unit. The connection server selectively connects two or more of the teleconference apparatuses so that visual information, taken by the image taking unit, and audio information, taken by the sound taking unit, provided for a first teleconference apparatus in a first teleconference room, are respectively output to the display unit and the audio output unit provided for a second teleconference apparatus disposed in a second teleconference room. Each of the teleconference apparatus includes a person identification information acquisition unit to obtain person identification information identifying each individual present in each of the conference rooms. The connection server includes a conference venue information storage, a conference start judgment unit, and a teleconference apparatus connection unit. The conference venue information storage stores conference information including person identification information of expected participant assigned to each conference room for each of teleconferences to be held. The conference start judgment unit determines whether each to-be-held teleconference satisfies a conference start condition based on a comparison of the person identification information included in the conference information and the person identification information obtained by the person identification information acquisition unit from each conference room. The teleconference apparatus connection unit connects teleconference apparatuses used for the teleconference when the teleconference is determined to satisfy the conference start condition.

In another aspect of the present invention, a method of supporting a communication connection among conference rooms used for a teleconference is devised. The method includes the steps of: determining whether there is a conference room reserved for a given teleconference but not satisfying conditions for participation when the given teleconference is to start; searching for other conference rooms satisfying the conditions for participation when it is determined that the reserved conference room does not satisfy the conditions for participation; detecting another conference room that satisfies the conditions for participation; and changing the teleconference venue from the conference room that does not satisfy conditions for participation to the conference room detected at the detecting step that does satisfy the conditions for participation.

In another aspect of the present invention, a method of estimating utility of establishing a teleconference between individuals entering different conference rooms not previously reserved for teleconferencing is devised. The method includes the steps of: receiving person identification information of the individuals entering the conference rooms not reserved for teleconference; computing a degree of relatedness between the individuals; determining degree of relatedness between one individual entering one conference room and another individual or individuals entering another conference room based on the results of computing the degree of relatedness; determining whether the one conference room and the other conference room not reserved for a teleconference satisfy a conference start condition once the degree of relatedness is determined; and establishing a session between teleconference apparatuses disposed in each of the conference rooms when it is determined that the one conference room and other conference room satisfy the conference start condition.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 illustrates example conference information stored in a conference venue information storage of the conference room connection server of FIG. 4;

Figure 1:
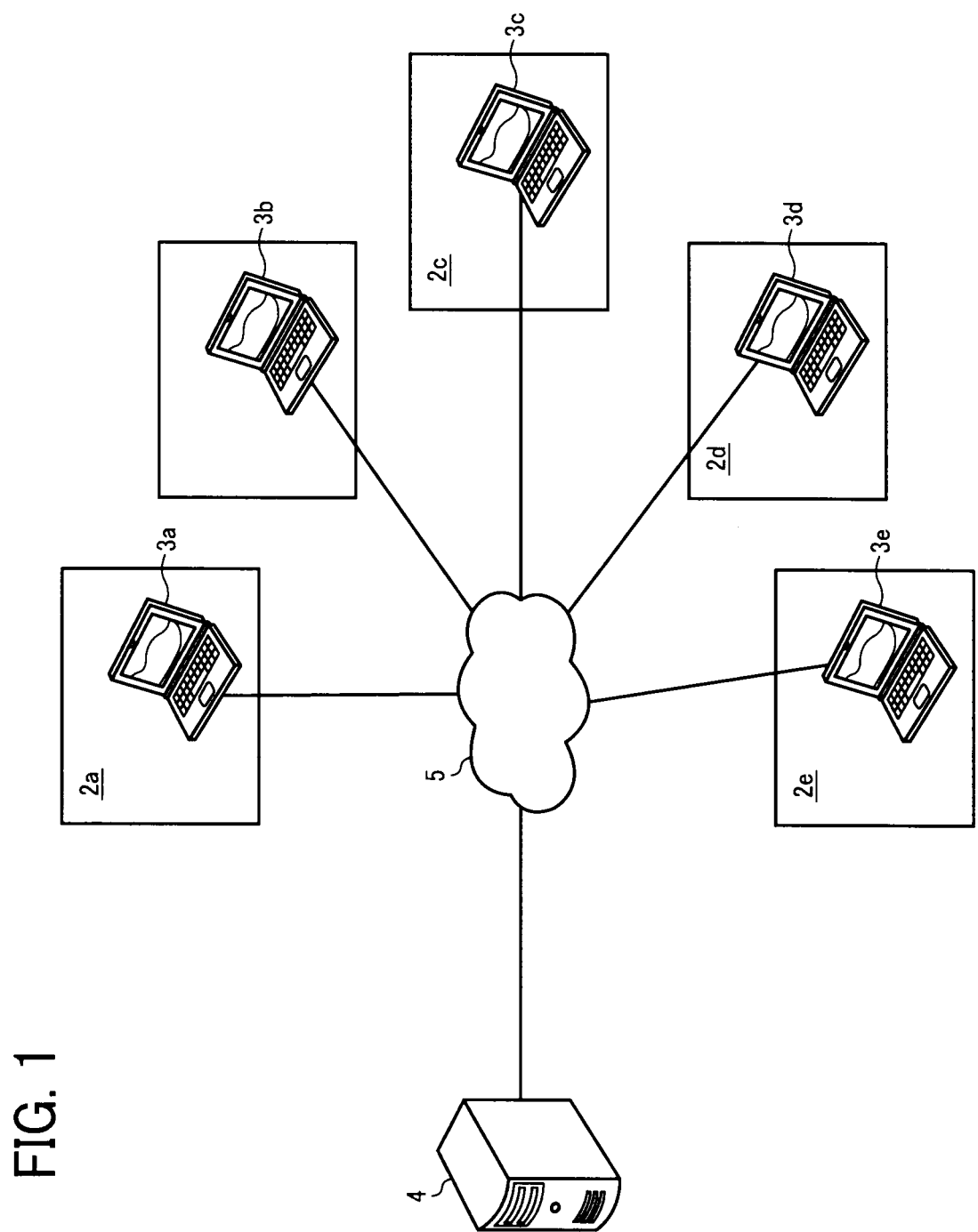
FIG. 1 illustrates a block diagram of teleconference support system according to a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another element, component, region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner.

Referring now to the drawings, a teleconference support system according to example embodiments is described. FIGS. 1 to 7 illustrate a teleconference support system according to a first example embodiment.

First Example Embodiment

FIG. 1 illustrates a teleconference support system 1 according to the first example embodiment. The teleconference support system 1 may be configured with a plurality of conference rooms 2a to 2e, a plurality of teleconference apparatuses 3a to 3e, and a conference room connection server 4 (hereinafter, referred to as connection server 4). The conference rooms 2a to 2e may not be limited rooms but may be compartments, areas, or the like, which can be used as conference areas. Hereinafter, the plurality of conference rooms 2a to 2e may be referred to collectively as "conference room 2" to indicate a single conference room or a plurality of conference rooms. The teleconference apparatuses 3a to 3e is disposed at each of the conference rooms 2a to 2e, respectively. Hereinafter, the plurality of teleconference apparatuses 3a to 3e may be referred to collectively as "teleconference apparatus 3" to indicate a single teleconference apparatus or a plurality of teleconference apparatuses. The connection server 4 can connect the teleconference apparatuses 3a to 3e selectively.

The teleconference apparatuses 3a to 3e and the connection server 4 can be connected with each other using a network 5 such as telephone line, special communication line, or the internet, for example. Although FIG. 1 shows five conference rooms 2a to 2e and five teleconference apparatuses 3a to 3e, the number of conference rooms and teleconference apparatuses used for the teleconference support system is not limited to any specific number.

Figure 2:
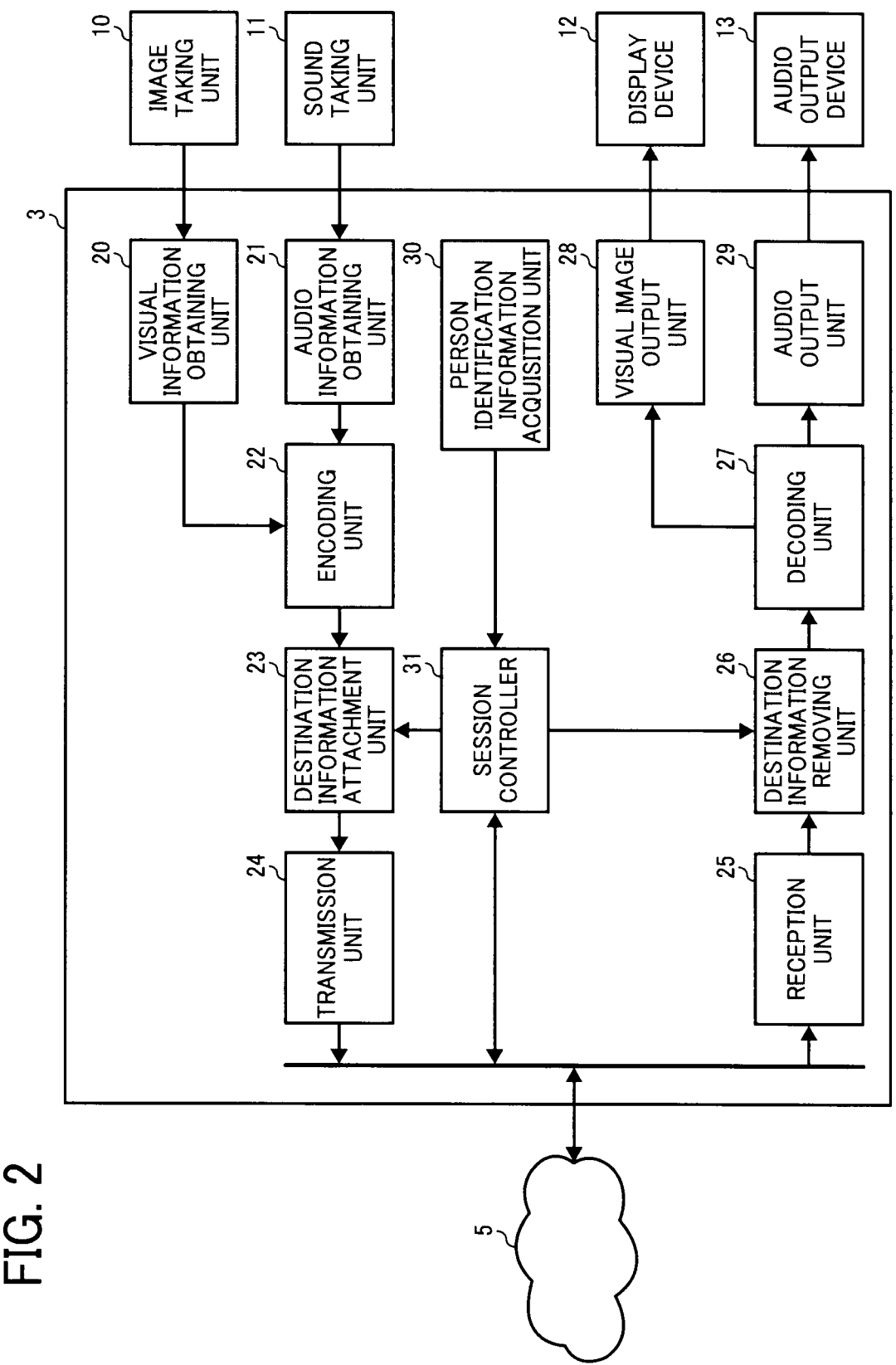
FIG. 2 illustrates a block diagram of teleconference apparatus used for the teleconference support system according to a first example embodiment.

As illustrated in FIG. 2, the teleconference apparatus 3 may be provided with an image taking unit 10, a sound taking unit 11, a display device 12, and an audio output device 13, for example. The image taking unit 10 takes visual information such as scenes in the conference room 2, and the sound taking unit 11 takes audio/sound information such as voice in the conference room 2. The display device 12 for displaying image information and the audio output device 13 for outputting voice and/or sound may be disposed in the conference room 2. The image taking unit 10 may be a typical camera, and the sound taking unit 11 may be a typical microphone. Further, the display device 12 may be a typical display apparatus, projector, or the like, and the audio output device 13 may be a typical speaker, or the like.

The teleconference apparatus 3 may include a visual information obtaining unit 20, an audio information obtaining unit 21, an encoding unit 22, a destination information attachment unit 23, a transmission unit 24, a reception unit 25, a destination information removing unit 26, a decoding unit 27, a visual image output unit 28, an audio output unit 29, a person identification information acquisition unit 30, and a session controller 31, for example.

The visual information obtaining unit 20 obtains visual (or video) information such as image, scene, or the like taken by the image taking unit 10. The audio information obtaining unit 21 obtains audio information such as voice, sound, or the like, taken by the sound taking unit 11.

The encoding unit 22 conducts a given encoding process on the visual information obtained by the visual information obtaining unit 20 and the audio information obtained by the audio information obtaining unit 21, wherein such coded visual and audio information may be referred to as "encoded information."

The destination information attachment unit 23 attaches destination information such as internet protocol (IP) header or the like to the encoded information encoded by the encoding unit 22.

The transmission unit 24 transmits the encoded information attached with the destination information to the network 5.

The reception unit 25 receives the encoded information from the network 5.

The destination information removing unit 26 removes the destination information from the encoded information.

The decoding unit 27 decodes the encoded information to regenerate visual information and audio information.

The visual image output unit 28 outputs the visual information decoded and regenerated by the decoding unit 27 to the display device 12.

The audio output unit 29 outputs the audio information decoded and regenerated by the decoding unit 27 to the audio output device 13.

The person identification information acquisition unit 30 obtains person identification information to identify each of individuals being present in the conference room 2.

The session controller 31 controls a session processing with other teleconference apparatus 3.

The person identification information acquisition unit 30 may obtain person identification information of each of individuals being present in the conference room 2 as biometrics information, for example. Such biometrics information may be face information, audio information, for example. As such, face information of each of individuals being present in the conference room 2 may be used as biometrics information. Specifically, the person identification information acquisition unit 30 extracts face information of each of individuals being present in the conference room 2 from the visual information taken by the image taking unit 10 to obtain feature values of the extracted face information, and then based on the feature values of the extracted face information, the person identification information acquisition unit 30 obtains person identification of each of individuals being present in the conference room 2.

Similarly, audio information of each of individuals being present in the conference room 2 can be used as biometrics information. Specifically, the person identification information acquisition unit 30 extracts voiceprint of each of individuals being present in the conference room 2 from the audio information taken by the sound taking unit 11, and then based on the extracted voiceprint, the person identification information acquisition unit 30 obtains person identification information of each of individuals being present in the conference room 2.

As noted, the person identification information acquisition unit 30 can obtain person identification information based on feature values of face information taken by the image taking unit 10. Alternatively, instead of such configuration, the teleconference apparatus 3 can be disposed with another image taking unit, which may be used to obtain biometrics information, in addition to the image taking unit 10.

The person identification information acquisition unit 30 can obtain person identification information based on feature values of voiceprint taken by the sound taking unit 11. Alternatively, instead of such configuration, the teleconference apparatus 3 can be disposed with another sound taking unit, which may be used to obtain biometrics information, in addition to the sound taking unit 11.

Further, the person identification information acquisition unit 30 can obtain person identification information using an entry/exit management apparatus, which can be disposed at an entrance/exit of the conference room 2. Such entry/exit management apparatus may read person identification information stored in an identification (ID) card possessed by each of individuals. For example, the ID card may be a radio frequency identification (RFID) tag, and the entry/exit management apparatus may read person identification information stored in the RFID tag using a card reader, for example. As such, the RFID tag can be used as an identification storing device, which stores person identification information.

Further, the entry/exit management apparatus may obtain person identification information based on features obtained as biometrics information such as for example fingerprint, hand shape, retina, iris, face, ear shape, voiceprint, vein pattern in palm of and back of the hand, and vein pattern in finger.

The session controller 31 transmits the person identification information obtained by the person identification information acquisition unit 30 to the connection server 4 via the network 5. When such person identification information is received, the connection server 4 select or designate another teleconference apparatus 3 so that the session controller 31 of one teleconference apparatus 3 establishes a session with another teleconference apparatus 3, or ends a session with another teleconference apparatus 3 that has already been established.

The destination information attachment unit 23 attaches destination information, designating a transmission destination of data, to the information encoded by the encoding unit 22, in which the destination information is assigned to one teleconference apparatus 3 that the session controller 31 has established a session. Then, destination information attachment unit 23 outputs the encoded information attached with the destination information to the transmission unit 24.

The destination information removing unit 26 receives the encoded information from the reception unit 25, in which the encoded information is transmitted from one teleconference apparatus 3, used as a sender, that the session controller 31 has established a session for the one teleconference apparatus 3. If the destination information removing unit 26 receives encoded information not including destination information for itself, the destination information removing unit 26 discards such encoded information. If the destination information removing unit 26 receives encoded information including destination information for itself, the destination information removing unit 26 removes the destination information from the encoded information and outputs the encoded information to the decoding unit 27.

Figure 3:
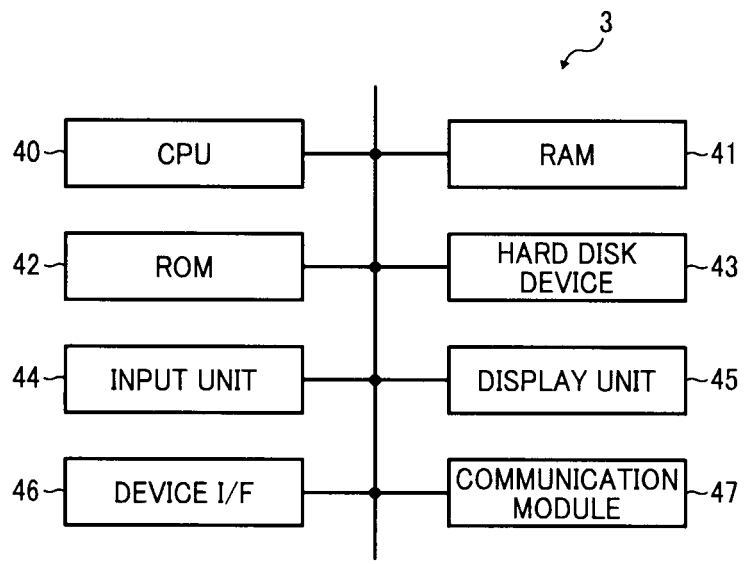
FIG. 3 illustrates a hardware configuration of teleconference apparatus used for the teleconference support system according to a first example embodiment.

As illustrated in FIG. 3, the teleconference apparatus 3 may be a typical terminal apparatus. Specifically, the teleconference apparatus 3 may include a central processing unit 40 (CPU 40), a random access memory (RAM 41), a read only memory 42 (ROM 42), a hard disk device 43, an input unit 44, a display unit 45, a device interface 46 (device I/F 46), and a communication module 47, for example. The input unit 44 may be a keyboard, a pointing device, or the like. The display unit 45 may be a liquid crystal display (LCD), or the like. The device I/F 46 is used to conduct communications with peripheral units such as the image taking unit 10, the sound taking unit 11, the display device 12, the audio output device 13, or the like. The communication module 47 is used to conduct communications with external apparatuses such as the teleconference apparatus 3 and the connection server 4 connected with each other via the network 5.

The ROM 42 and the hard disk device 43 store software programs to function the terminal apparatus as the teleconference apparatus 3. Specifically, when the CPU 40 activates software programs stored in the ROM 42 and the hard disk device 43 on the RAM 41 used as a working memory, the terminal apparatus can function as the teleconference apparatus 3.

The visual information obtaining unit 20, the audio information obtaining unit 21, the visual image output unit 28, and the audio output unit 29 shown in FIG. 2 may be provided with the device I/F 46. The device I/F 46 may be a universal serial bus (USB) port and an input/output jack used for audio information, for example.

Further, the encoding unit 22, the destination information attachment unit 23, the destination information removing unit 26 and the decoding unit 27 may be implemented by the CPU 40. The transmission unit 24, the reception unit 25, and the session controller 31 may be implemented using the CPU 40 and the communication module 47.

Further, the image taking unit 10, the sound taking unit 11, the display device 12, and the audio output device 13 can be disposed in the teleconference apparatus 3, in which such units may be integrated with the teleconference apparatus 3. For example, the display device 12 may be implemented using the display unit 45.

Figure 4:
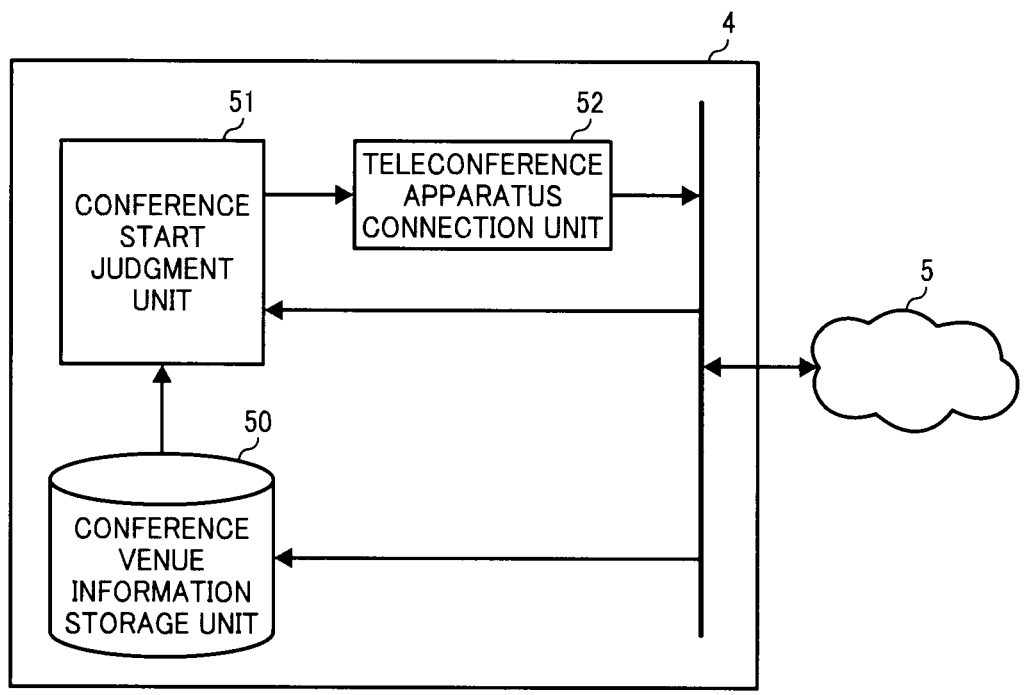
FIG. 4 illustrates a block diagram of a conference room connection server used for the teleconference support system according to a first example embodiment.

As illustrated in FIG. 4, the connection server 4 may include a conference venue information storage unit 50, a conference start judgment unit 51, and a teleconference apparatus connection unit 52, for example.

The conference venue information storage unit 50 stores conference information such as venue schedule of teleconference.

The conference start judgment unit 51 determines whether each of to-be-held teleconferences satisfies a conference start condition.

The teleconference apparatus connection unit 52 connects teleconference apparatuses 3 disposed in the teleconference rooms when it is determined that conference start conditions are satisfied.

As illustrated in FIG. 5, the conference venue information storage unit 50 stores conference information such as conference identification (conference ID) number, a start date/time and finish date/time of each conference, an identifier of each conference room 2 (i.e., identifier of teleconference apparatus 3), conditions for participation of each conference room 2, person identification information of expected participant for each conference room 2, and priority level of expected participant, for example. The conference ID number is provided as an identifier of conference rooms to be used for teleconference. The priority level of expected participant indicates whether the expected participant is important or not. For example, if the important participant is not present, the conference may not be started. Such conference information can be registered in the conference venue information storage unit 50 using the teleconference apparatus 3, or other terminal apparatus connected via the network 5.

The conference start judgment unit 51 determines whether each of the conference rooms 2 reserved for one given teleconference satisfies conditions for participation by comparing person identification information stored in the conference venue information storage 50 and person identification information transmitted by the session controller 31 of the teleconference apparatus 3. As described above, the conference venue information storage unit 50 stores the conference information, which may include person identification information of expected participants for each conference room 2.

The conference start judgment unit 51 determines whether each conference room 2 satisfies conditions for participation for one given teleconference, and determines whether the one given teleconference satisfies a conference start condition. Specifically, the conference start judgment unit 51 determines whether all of the reserved conference rooms 2 satisfy conditions for participation for one given teleconference. Such determination may be conducted for each teleconference.

The conditions for participation may be, but are not limited to: 1) conditions for participation are satisfied when all of person identification information stored in conference information matches to person identification information received from the session controller 31 of the teleconference apparatus 3; 2) conditions for participation are satisfied when at least one person identification information stored in conference information matches to person identification information received from the session controller 31 of the teleconference apparatus 3; and 3) the conditions for participation are satisfied when expected numbers (or a given proportion) of person identification information stored in the conference information matches the person identification information received from the session controller 31 of the teleconference apparatus 3.

Further, the conference start judgment unit 51 may determine whether the conditions for participation are satisfied for the relevant conference room 2 based on priority or importance level set for person identification information included in the conference information.

As shown in FIG. 5, in one case, a teleconference having a conference ID 151 registered with conference rooms 2a and 2b may be processed by the conference start judgment unit 51 as follows.

For example, when the conference start judgment unit 51 receives person identification information of all expected participants A-1, A-2, A-3 from the session controller 31 of the teleconference apparatus 3 disposed in the conference room 2a, the conference start judgment unit 51 determines that the conference room 2a satisfies conditions for participation.

Further, the conference start judgment unit 51 determines that the conference room 2b satisfies a conditions for participation when the conference start judgment unit 51 receives 50% or more of person identification information of expected participants B-1, B-2, B-3 from the session controller 31 of the teleconference apparatus 3b disposed in the conference room 2b (in this case, 50% or more means two participants).

The conference start judgment unit 51 determines that the teleconference having the conference ID 151 satisfies a conference start condition when present date/time becomes equal to or later than a start date/time information (e.g., Mar. 9, 2009, 14:00) and when it is determined that the conference rooms 2a and 2b satisfy the conditions for participation described above.

As shown in FIG. 5, in another case, a teleconference having a conference ID 152 registered with conference rooms 2c, 2d, and 2e, may be processed by the conference start judgment unit 51 as follows. When the conference start judgment unit 51 receives person identification information of all expected participants C1 and C2 having higher priority level (see a column of priority level in FIG. 5) from the session controller 31 of the teleconference apparatus 3 disposed in the conference room 2c, the conference start judgment unit 51 determines the conference room 2c satisfies conditions for participation.

Further, the conference start judgment unit 51 determines that the conference room 2d satisfies a conditions for participation when the conference start judgment unit 51 receives one of person identification information of expected participants D-1 and D-2 from the session controller 31 of the teleconference apparatus 3d disposed in the conference room 2d (in this case, person identification information of one participant is received).

Further, the conference start judgment unit 51 determines that the conference room 2e satisfies conditions for participation when the conference start judgment unit 51 receives person identification information of all expected participants E-1 and E-2 from the session controller 31 of the teleconference apparatus 3e disposed in the conference room 2e.

The conference start judgment unit 51 determines that the teleconference having the conference ID 152 satisfies a conference start condition when present date/time information becomes equal to or later than a start date/time information (e.g., Mar. 9, 2009, 14:40) and when it is determined that the conference rooms 2c, 2d, and 2e satisfy the conditions for participation described above.

Further, when the conference start judgment unit 51 detects that one or more conference rooms 2 that do not satisfy conditions for participation reserved for a given teleconference when the time becomes a conference starting time, the conference start judgment unit 51 may search other conference rooms 2 that do satisfy the conditions for participation. One example case, in which a conference room reserved for one teleconference is determined as not satisfying conditions for participation, is now described. For example, one conference room X, which is reserved for one teleconference, may be determined as not satisfying conditions for participation. Originally, the conference room X is reserved as one conference room for one teleconference with given conditions for participation stipulating that person A will participate in the teleconference in the conference room X when the conference starting time has come. However, when the conference starting time has come, the conference room X is occupied by other persons B and C, and the person A is not present. In such a case, a session controller 31X of teleconference apparatus 3X disposed in the conference room X detects and transmits person identification information of persons B and C when the conference starting time has come. Because the persons B and C are not expected participants of the teleconference, the conference room X does not satisfy conditions for participation reserved for the given teleconference. In this situation, the person A may enter another conference room Y, which may be provided with a teleconference apparatus 3Y. Then, a session controller 31Y of teleconference apparatus 3Y transmits person identification information of person A, thereby allowing conference room Y to be recognized as a conference room for the given teleconference when the time becomes a conference starting time. As such, when an originally reserved room cannot be used for teleconference, other rooms may be used for the teleconference by using the teleconference support system described herein. Such flexible conference room switching can be conducted as described above, but is not limited thereto.

As such, the conference start judgment unit 51 may determine whether person identification information transmitted from the session controller 31 of each of teleconference apparatuses 3 satisfies conditions for participation, enabling a conference room 2 that satisfies conditions for participation to be found. When the conference start judgment unit 51 detects a conference room 2 that does not satisfy conditions for participation, the conference start judgment unit 51 changes the conference room for the teleconference from the conference room 2 that does not satisfy conditions for participation to the other conference room 2 that does satisfy the conditions for participation and holds the teleconference.

The teleconference apparatus connection unit 52 (see FIG. 4) establishes a session between given teleconference apparatuses 3. Specifically, when it is determined that the conference start conditions are satisfied as above described, the teleconference apparatus connection unit 52 notifies a uniform resource identifier (URI) of each teleconference apparatus 3 of the counterpart teleconference apparatuses 3 in which a URI of one teleconference apparatus 3 is transmitted to the session controller 31 of other teleconference apparatus 3, which is identified as a to-be-connected counterpart teleconference apparatus.

Figure 6:
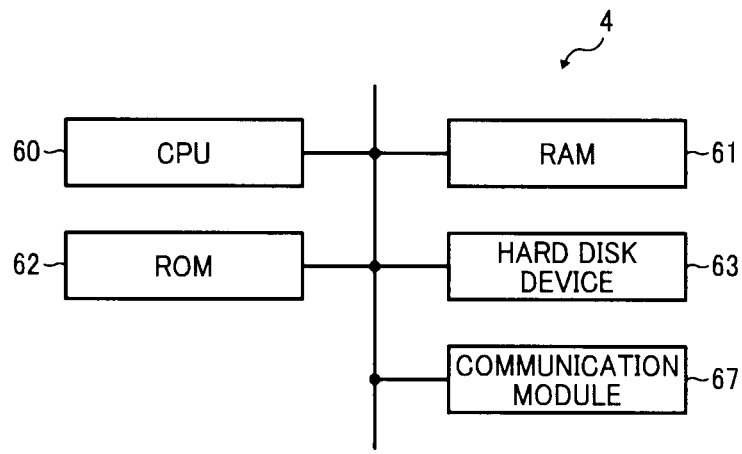
FIG. 6 illustrates a hardware configuration of the conference room connection server used for the teleconference support system according to a first example embodiment.

As illustrated in FIG. 6, the connection server 4 may be a typical terminal apparatus. Specifically, the connection server 4 may include a CPU 60, a RAM 61, a ROM 62, a hard disk device 63, and a communication module 67, for example. The communication module 67 is used to conduct communications with external apparatuses such as the teleconference apparatus 3 connected via the network 5.

The ROM 62 and the hard disk device 63 store software programs that enable the terminal apparatus to function as the connection server 4. Specifically, when the CPU 60 activates software programs stored in the ROM 62 and the hard disk device 63 on the RAM 61 is used as working memory, and the terminal apparatus functions as the connection server 4.

Further, the conference venue information storage unit 50 shown in FIG. 4 may be implemented using the CPU 60, the hard disk device 63, and the communication module 67. The conference start judgment unit 51 and the teleconference apparatus connection unit 52 may be implemented using the CPU 60 and the communication module 67.

Figure 7:
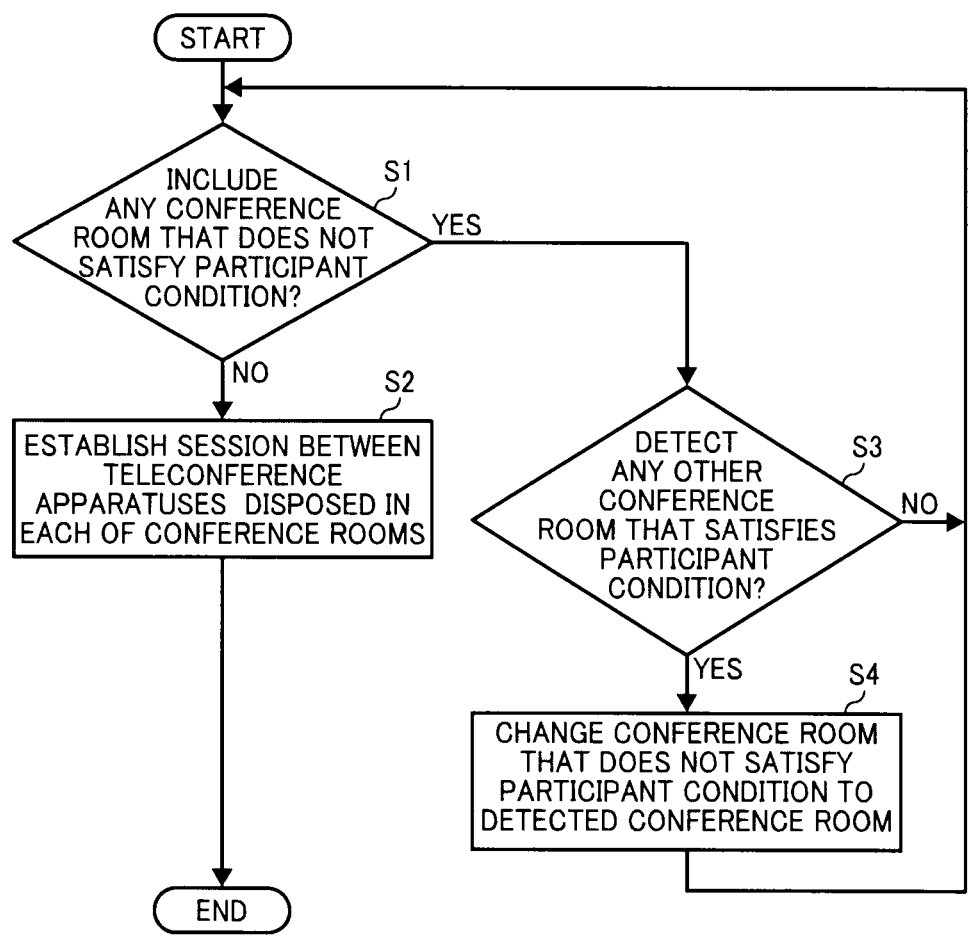
FIG. 7 illustrates a flowchart showing a method of conference room connection activating process conductable by the conference room connection server used for the teleconference support system according to a first example embodiment.

A description is now given of a conference room connection activating process conducted by the connection server 4, with reference to FIG. 7. The conference room connection activating process may be conducted when the conference start judgment unit 51 receives person identification information obtained by the person identification information acquisition unit 30 of the teleconference apparatus 3 disposed in each of the conference rooms 2, and when each of teleconferences is to be held at a start date/time information, which is stored in the conference venue information storage unit 50 as conference information.

Initially, the conference start judgment unit 51 determines whether there is a conference room 2 that does not satisfy conditions for participation for a given teleconference (step S1). If it is determined that there is no conference rooms 2 that does not satisfy the conditions for participation (i.e., all conference rooms 2 satisfy the conditions for participations), the teleconference apparatus connection unit 52 establishes a session between the teleconference apparatuses 3 disposed in each of the conference rooms 2 (step S2), and then the conference room connection activating process ends.

On the other hand, if it is determined that there is at least one conference room 2 that does not satisfy conditions for participation, the conference start judgment unit 51 searches other conference room 2 that do satisfy the conditions for participation (step S3). If a conference room 2 that satisfies the conditions for participation is detected, the conference room to hold the relevant teleconference can be changed from the conference room 2 that does not satisfy conditions for participation to the detected conference room 2 that satisfies the conditions for participation (step S4), and the conference room connection activating process returns to step S1. Such conference room switching can be conducted as previously explained with the conference rooms X and Y, for example. If the conference room 2 that satisfies the conditions for participation cannot be detected (step S3: No), the conference room connection activating process returns to step S1.

As described above, in the first example embodiment, the teleconference support system 1 may start a teleconference as below. Based on person identification information obtained by the person identification information acquisition unit 30, it can be determined whether each of the conference rooms 2 is ready to start the teleconference. If it is determined that each of the conference rooms 2 is ready to start the teleconference, transmission/reception of video (or visual) and audio information between each of the conference rooms 2 can be started. Accordingly, a teleconference can be started when each of the conference rooms 2 is ready to start the teleconference without manual operation of users or participant of the teleconference.

Second Example Embodiment

A description is now given to a second example embodiment, in which the configuration of a connection server 4 according to the first example embodiment is modified while the teleconference support system 1 shown in FIG. 1 can be similarly applied for the second example embodiment.

Figures 8, 9:
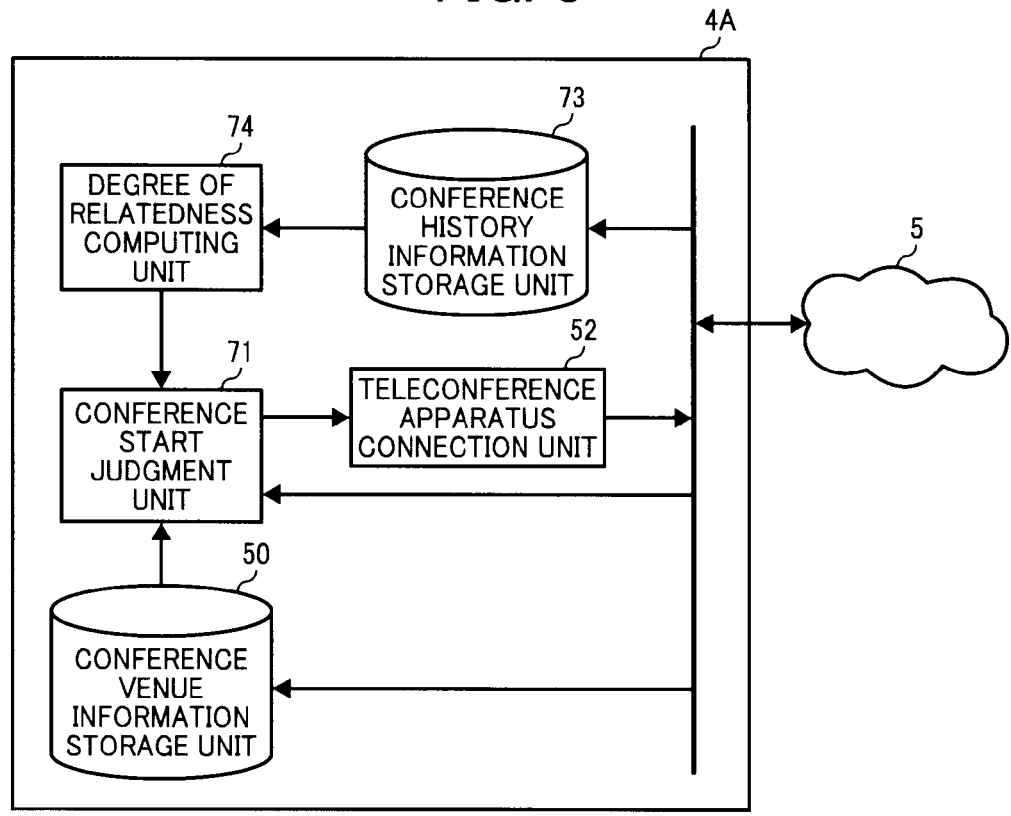
FIG. 8 illustrates a block diagram of conference room connection server used for a teleconference support system according to a second example embodiment.
FIG. 9 illustrates example conference history information stored in a conference history information storage of the conference room connection server of FIG. 8.

As illustrated in FIG. 8, a connection server 4A may include the conference venue information storage unit 50, the teleconference apparatus connection unit 52, a conference start judgment unit 71, a conference history information storage unit 73, and a degree of relatedness computing unit 74, for example.

The conference start judgment unit 71 determines whether each of to-be-held teleconferences satisfies a conference start condition.

The conference history information storage unit 73 stores conference history information such as person identification information of participants who participated in past teleconferences. The information of participated participants may be stored in the conference history information storage unit 73 each time a teleconference is held.

The degree of relatedness computing unit 74 computes degree of relatedness between participants based on the conference history information described above.

A description is now given of the second embodiment of the teleconference support system of the present disclosure. The conference venue information storage unit 50 and the teleconference apparatus connection unit 52 of the connection server 4A according to the second example embodiment are the same as the conference venue information storage unit 50 and the teleconference apparatus connection unit 52 according to the first example embodiment described above, and thus a detailed description thereof is omitted.

Similarly, a hardware configuration of connection server 4A according to the second example embodiment are similar to as the connection server 4 according to the first example embodiment, and therefore a description of such hardware configuration of connection server 4A is omitted. The connection server 4A can implement processing according to the second example embodiment by changing software programs activated by the CPU 60 (see FIG. 6), for example.

The conference venue information storage unit 50 and the conference history information storage unit 73 of FIG. 8 may be implemented using the CPU 60, the hard disk device 63, and the communication module 67 shown in FIG. 6. The conference start judgment unit 71 and the teleconference apparatus connection unit 52 may be implemented using the CPU 60, and the communication module 67. The degree of relatedness computing unit 74 may be implemented using the CPU 60.

As illustrated in FIG. 9, the conference history information stored in the conference history information storage unit 73 may include conference ID(s) of past teleconference(s), a start date/time information of teleconference(s), and person identification information of participants of teleconference(s), for example.

The degree of relatedness computing unit 74 can compute degree of relatedness between participants as below, for example. Specifically, the degree of relatedness computing unit 74 may compute a time span value "ts" between the present date/time information and a start date/time information of a past teleconference. Specifically, the time span value "ts" can be obtained by subtracting the start date/time information of a past teleconference from the present date/time information. The degree of relatedness computing unit 74 then computes a degree of relatedness "T" based on time using a function f(t), which outputs a value that decreases as the time span value "ts" increases. For example, the degree of relatedness computing unit 74 may use a function of f(t)=T=m/ts+n (m, n: constant value).

The degree of relatedness computing unit 74 computes a participant relation matrix to express degree of relatedness between participants. For example, participants A, B, and C participated in a previous teleconference, and then conference participation history of such three participants can be expressed by a participated conference history matrix "RAi, RBi, RCi." Such participated conference history matrix RAi, RBi, RCi may have initial values RA0, RB0, RC0 (see below). Each element of the participated conference history matrix corresponds to each of the participants A, B, C, respectively.

RA0=(1, 0, 0)
RB0=(0, 1, 0)
RC0=(0, 0, 1)

If the conference history information includes a teleconference held by the participants A and B, the degree of relatedness computing unit 74 updates the participated conference history matrix RAi, RBi, RCi as follows:

RAi=(1, 1, 0)
RBi=(1, 1, 0)
RCi=(0, 0, 1)

When the entry number of teleconferences included in the conference history information is set to "n," and participated conference history matrix of each of participants is set to "Ri," the degree of relatedness computing unit 74 computes the participant relation matrix Ra of each of participants the using formula (I).

$$Ra = \sum_{i=1}^{n} TiRi \qquad \text{formula (1)}$$

The degree of relatedness computing unit 74 may compute such participant relation matrix Ra for each of participants when the conference history information is updated, and store the computed participant relation matrix Ra to the RAM 61 or the hard disk device 63, for example.

The degree of relatedness computing unit 74 computes distance "d" between participant relation matrixes Ra in Euclidean space. If the computed distance "d" is less than a threshold value TH set in advance, it is determined that the two participants have a higher degree of relatedness. On the other hand, if the computed distance "d" is the threshold value TH or more, it is determined that the two participants have a lower degree of relatedness.

It is to be noted that the conference start judgment unit 71 may have a function that is the same as the conference start judgment unit 51 in the connection server 4 according to the first example embodiment, and the conference start judgment unit 71 may have another function. For example, when individuals enter the conference rooms 2 for which no teleconference is scheduled, the conference start judgment unit 71 can estimate whether the conference rooms are to be used for teleconference based on person identification information of individuals that have entered the conference rooms 2 and degree of relatedness of participants computed by the degree of relatedness computing unit 74.

The conference start judgment unit 71 determines whether a teleconference is to be held in a conference room 2 based on conference-related information stored in the conference venue information storage unit 50. As described above, the conference room 2 includes the teleconference apparatus 3, in which the teleconference apparatus 3 may transmit person identification information when an individual enters the conference room 2.

Whether a conference room 2 at present date/time is used for a teleconference or not may be determined as follows. A to-be-held teleconference has a start date/time and finish date/time of teleconference. The present date/time information is compared with the start date/time and finish date/time of teleconference. If the present date/time information is before a start date/time of to-be-held teleconference for a given time period (e.g., 10 minutes or more before the start of teleconference), or if the present date/time information is after the finish date/time of teleconference, it is determined that the teleconference is not be held in the conference room 2 at the present date/time.

Further, the conference start judgment unit 71 may determine whether different conference rooms 2, entered by different individuals, satisfy a conference start condition. For example, when individuals enter different conference rooms 2 that have no schedule for a teleconference, the degree of relatedness computing unit 74 may compute degree of relatedness between the individuals. When the number of combinations of individuals having a higher degree of relatedness becomes greater than the number of combinations of individuals having a lower degree of relatedness, the conference start judgment unit 71 may determine that the conference rooms 2, entered by the different individuals, satisfy a conference start condition of teleconference.

Figure 10:
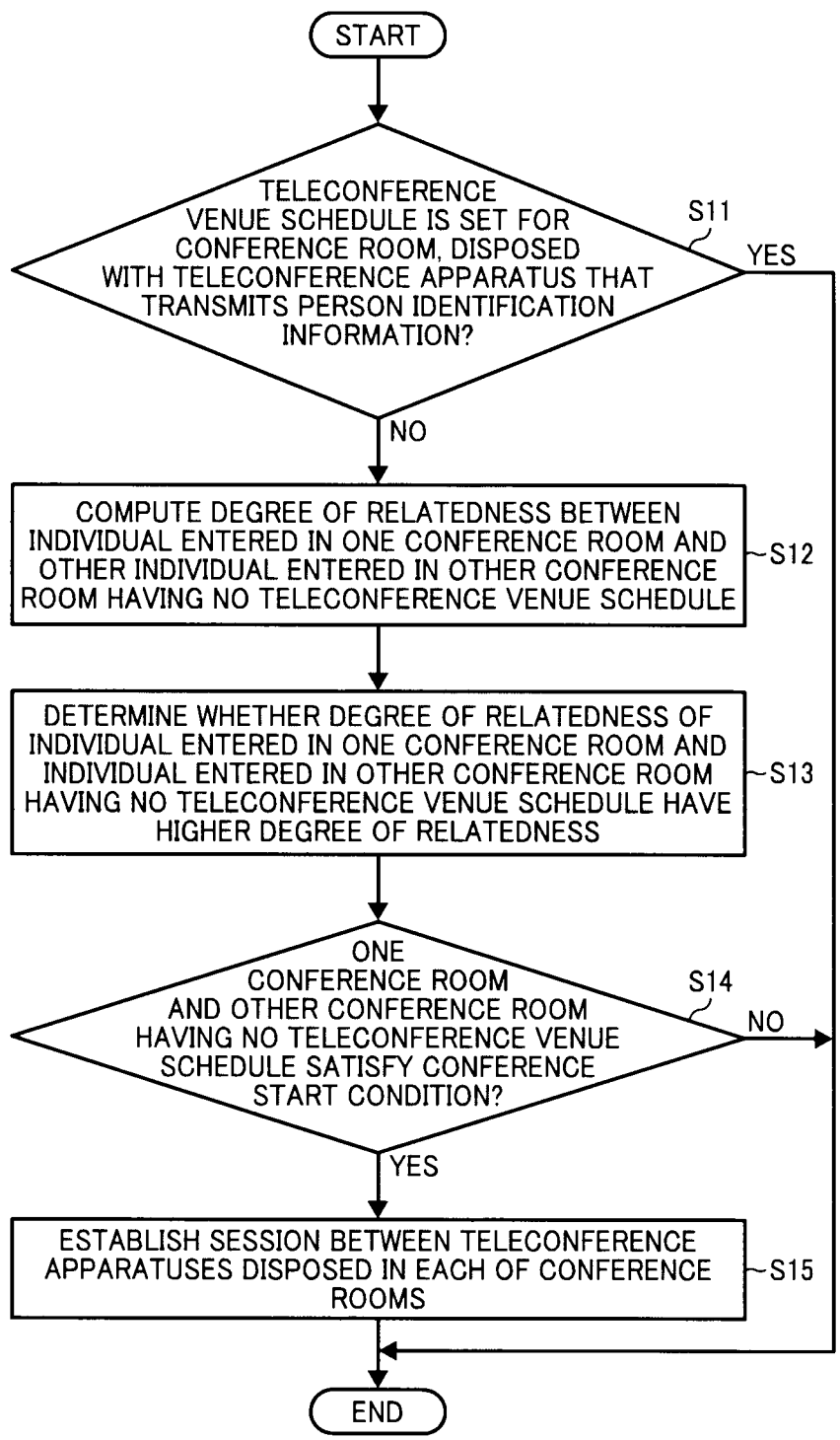
FIG. 10 illustrates a flowchart showing a method of conference room estimation and connection process conductable by the conference room connection server used for the teleconference support system according to a second example embodiment.

A description is now given of a conference room estimation and connection process by such configured connection server 4A with reference to FIG. 10. The conference room estimation and connection process can be conducted independently from the conference room connection activating process according to the first example embodiment described above.

The conference room estimation and connection process may be conducted when the conference start judgment unit 51 receives person identification information, obtained from the person identification information acquisition unit 30 in the teleconference apparatus 3 disposed for each of conference rooms 2.

Based on conference information stored in the conference venue information storage unit 50, the conference start judgment unit 71 determines whether a teleconference venue schedule is set for one conference room 2 when the teleconference apparatus 3, disposed in the one conference room 2, transmits person identification information (step S11).

If it is determined that the one conference room 2 is set as a teleconference venue schedule (step S11:Yes), the conference room estimation and connection process ends. On the other hand, if it is determined that the one conference room 2 has not been set as a teleconference venue schedule (step S11:No), the degree of relatedness computing unit 74 computes the degree of relatedness between individual entering the one conference room 2 and other individuals entering other conference room(s) 2 not reserved as a teleconference venue (step S12).

Based on such computing result of the degree of relatedness, the degree of relatedness computing unit 74 determines whether degree of relatedness between the individual entered the conference room 2 and the individual entered other conference room 2 having no reservation of teleconference venue have a higher degree of relatedness (step S13). Based on computation result of the degree of relatedness computing unit 74, the conference start judgment unit 71 determines whether the one conference room 2 and other conference room 2 not reserved as a teleconference venue satisfy a conference start condition (step S14).

If it is determined that the one conference room 2 and other conference room(s) 2 not reserved as a teleconference venue satisfy the conference start condition (step S14:Yes), the teleconference apparatus connection unit 52 establishes a session between the teleconference apparatuses 3 provided in each of the conference rooms 2 (step S15), and the conference room estimation and connection process ends.

On the other hand, if it is determined that the one conference room 2 and other conference room 2 not reserved as a teleconference venue do not satisfy the conference start condition (step S14:No), the conference room estimation and connection process ends without establishing a session.

At step S11 of the conference room estimation and connection process, the conference start judgment unit 71 may determine whether a teleconference venue is set (or teleconference is reserved) for the conference room 2 having the teleconference apparatus 3 that transmits person identification information. If it is determined that the conference room 2 is set with the teleconference venue, the conference room estimation and connection process ends.

In addition to such process, another process can be devised. For example, when it is determined that one conference room 2 is set with a teleconference venue at step S11, the conference start judgment unit 71 may determine whether one or more individuals, identified by person identification information received from the teleconference apparatus 3 of the one conference room 2, is included in expected participants of any one of teleconference venue based on the conference information stored in the conference venue information storage unit 50. If it is determined that such individual is included in the expected participants of any one of teleconference venue schedule, the conference room estimation and connection process ends after establishing a session.

As described above, in the teleconference support system according to the second example embodiment, transmission/reception of video (or visual) information and audio information between the conference rooms can be started based on participant history information including information of participants who have participated past teleconference(s). With such a configuration, periodically or frequently held teleconferences can be started without manual operation of users of teleconference even if such teleconference is not registered as conference information As described above, each of conference rooms for teleconference can be set ready to start a teleconference without a manual operation of users using the above described teleconference support system. Further, it should be noted that a teleconference may be held by using visual information alone, using audio information alone, or using both visual and audio information by changing configuration patterns of system or apparatus (e.g., combination of the above described parts, devices, units, apparatuses, or the like can be changed).

In the above described configurations of teleconference assisting system, based on person identification information obtained by the person identification information obtaining unit, it is determined whether each conference room is ready for starting a teleconference. When it is determined that each conference room is ready for starting the teleconference, transmission and reception of visual and audio information among each of conference rooms can be started. Accordingly, when the each conference room is ready for starting the teleconference, the teleconference can be started without manual operation by a user.

In the above described configurations of teleconference support system, person identification information of each of individuals can be obtained based on feature values extracted from faces of each of individuals in a conference room.

In the above described configurations of teleconference support system, person identification information of each of individuals can be obtained based on voiceprint of each of individuals in a conference room.

In the above described configurations of teleconference support system, it is determined that one conference room is ready for starting a teleconference when all of expected participants enter the conference room.

In the above described configurations of teleconference supportsystem, it is determined that one conference room is ready for starting a teleconference when at least one expected participant enters the conference room.

In the above described configurations of teleconference supportsystem, it is determined that one conference room is ready for starting a teleconference when expected numbers (or a given proportion) of expected participant enter the conference room.

In the above described configurations of teleconference supportsystem, it is determined that one conference room is ready for starting a teleconference when an important expected participant enters the conference room.

In the above described configurations of teleconference supportsystem, even if a conference room is suddenly changed from an original conference room, a scheduled teleconference can be held using the conference room changed from the original conference room.

In the above described configurations of teleconference supportsystem, based on history information of participants who have participated past teleconference(s), transmission and reception of video (or visual) and audio information among each of conference rooms can be started. Accordingly, teleconferences not registered in the conference information can be started without a manual operation by a user. For example, periodically or frequently held teleconferences can be started without a manual operation by a user.

In the above-described exemplary embodiments, a computer can be used with a computer-readable program to control functional units used for an information processing system or apparatus used for teleconference support system. For example, a particular computer may control the information processing apparatus and the information processing system or apparatus using a computer-readable program, which can execute the above-described processes or steps. Further, in the above-described exemplary embodiments, a storage device (or storage medium), which can store computer-readable program, may be a flexible disk, a compact disk read only memory (CD-ROM), a digital versatile disk read only memory (DVD-ROM), DVD recording only/rewritable (DVD-R/RW), a memory card, a memory chip, a mini disk (MD), magnetic tape, hard disk in a server, or the like, but not limited these. Further, a computer-readable program can be downloaded to a particular computer (e.g., personal computer) via a network, or a computer-readable program can be installed to a particular computer from the above-mentioned storage device, enabling the particular computer to be used for the information processing system or apparatus according to exemplary embodiments, for example.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A teleconference support system used for establishing a teleconference among a plurality of conference rooms, comprising:

a plurality of teleconference apparatuses, each of which is disposed in each of the conference rooms and provided with an image capture device configured to take visual information in each of the conference room, a sound capture device configured to take audio and sound information in each of the conference room, a display, and an audio output; and a connection server configured to selectively connect two or more of the teleconference apparatuses so that visual information, taken by the image capture device, and audio information, taken by the sound capture device, provided for a first teleconference apparatus in a first teleconference room, are respectively output to the display and the audio output provided for a second teleconference apparatus disposed in a second teleconference room, each of the teleconference apparatus including a person identification information acquisition unit implemented by first processing circuitry and configured to obtain person identification information identifying each individual present in each of the conference rooms, the connection server including:

a conference venue information storage configured to store conference information including a teleconference participant condition for each of the plurality of conference rooms included in the teleconference and expected person identification information of expected participants assigned to each conference room for the teleconference to be held;

a conference start judgment unit implemented by second processing circuitry and configured to determine whether the teleconference satisfies a conference start condition based on the participant condition and a comparison of the expected person identification information included in the conference information and the person identification information obtained by the person identification information acquisition unit from each conference room, wherein the conference start judgment unit is further configured to determine that the conference start condition has been satisfied in response to the participant condition for each of the plurality of conference rooms being satisfied, and at a conference start time, to determine whether another conference room satisfies the participant condition in place of a conference room in the teleconference that does not satisfy conditions for participation in the teleconference; and a teleconference apparatus connection unit implemented by the second processing circuitry and configured to connect teleconference apparatuses used for the teleconference when the teleconference is determined to satisfy the conference start condition, wherein the participant condition for each of the plurality of conference rooms includes one of 1) a condition which is satisfied when each person in the expected person identification information included in the conference information is matched to each person in the person identification information obtained by the person identification information acquisition unit, 2) a condition which is satisfied when at least one person in the expected person identification information included in the conference information is matched to persons in the person identification information obtained by the person identification information acquisition unit, and 3) a condition which is satisfied when an expected number of, or a proportion of the expect number of, persons in the expected person identification information included in the conference information is matched to persons in the person identification information obtained by the person identification information acquisition unit, and wherein the participant condition is individually set for each of the plurality of conference rooms.

2. The teleconference system according to claim 1, wherein the conference start judgment unit checks whether person identification information obtained by the person identification information acquisition unit from each conference room satisfies conditions for participation set for each conference room in advance for a teleconference, and the conference start judgment unit determines whether a conference start condition for teleconference is satisfied based on results of checking the conditions for participation for each conference room.

3. The teleconference system according to claim 2, wherein the conference start judgment unit determines that the conference room satisfies the conditions for participation when all person identification information included in the conference information matches the person identification information obtained by the person identification information acquisition unit from the conference room.

4. The teleconference system according to claim 3, wherein the conference information includes priority level information set for each of person identification information, the priority level information indicating an importance level of each expected participant, and the conference start judgment unit determines whether the participant condition is satisfied when person identification information having higher priority level included in the conference information is matched to the person identification information obtained by the person identification information acquisition unit for the conference room.

5. The teleconference system according to claim 2, wherein the conference start judgment unit determines that the conference room satisfies the conditions for participation when at least one person's identification information included in the conference information matches any person identification information obtained by the person identification information acquisition unit from the conference room.

6. The teleconference system according to claim 2, wherein the conference start judgment unit determines that the conference room satisfies the conditions for participation when a given expected proportion of person identification information included in the conference information matches the person identification information obtained by the person identification information acquisition unit from the conference room.

7. The teleconference system according to claim 1, wherein the person identification information acquisition unit obtains biometrics information of each individual present in each conference room as the person identification information.

8. The teleconference system according to claim 7, wherein the person identification information acquisition unit obtains the person identification information from feature values of face information extracted from a face image of each individual present in each conference room, the face image being taken by the image capture device.

9. The teleconference system according to claim 7, wherein the person identification information acquisition unit obtains the person identification information from feature values of voiceprint extracted from audio information of each individual present in each conference room, the audio information being taken by the sound capture device.

10. The teleconference system according to claim 1, wherein the connection server further includes:

a conference history information storage which stores conference history information including information of participants participated in past teleconferences, the conference history information being stored for each one of the past teleconference; and a degree of relatedness computing unit implemented by the second processing circuitry and configured to compute a degree of relatedness between the participants based on the conference history information, wherein the conference start judgment unit estimates that conference rooms are connectable for a teleconference based on person identification information of individuals entering conference rooms not scheduled for a teleconference and the degree of relatedness between participants computed by the degree of relatedness computing unit.

11. The teleconference system according to claim 1, wherein the person identification information acquisition unit obtains the person identification information of each individual present in each conference room from an identification storing device provided for each individual.

12. The teleconference system according to claim 1, wherein at least two of the plurality of conference rooms have different participant conditions.

13. The teleconference system according to claim 1, wherein the other teleconference room is a conference room not previously reserved for teleconferencing.

14. A method of estimating utility of establishing a teleconference between individuals entering different conference rooms not previously reserved for teleconferencing, the method comprising the steps of:
   receiving, by a computer having processing circuitry, person identification information of the individuals entering the conference rooms not reserved for teleconference;
   determining, by the computer having the processing circuitry, a degree of relatedness between at least one individual entering a first conference room and at least another individual entering a second conference room, the degree of relatedness being based on previous teleconferences between the at least one individual entering the first conference room and the other individual entering the second conference room;
   determining, by the computer having the processing circuitry, whether the first conference room and the second conference room, not reserved for a teleconference, each satisfy a conference start condition corresponding to the determined degree of relatedness; and
   establishing, by the computer having the processing circuitry, a session between teleconference apparatuses respectively disposed in the first and second conference rooms in response to a determination that the first conference room and the second conference room satisfy the conference start condition.

15. The method of claim 14, wherein the degree of relatedness is inversely proportional to a time span between a current time and a previous conference time between the at least one individual entering the first conference room and the other individual entering the second conference room.

16. The method of claim 14, wherein the determining determines that a conference start condition is satisfied when the number of combinations of individuals having a higher degree of relatedness is greater than the number of combinations of individuals having a lower degree of relatedness.

17. The method of claim 14, further comprising not initiating the teleconference between the first and second conference rooms until the conference start condition is satisfied.

18. A method for establishing a teleconference among a plurality of conference rooms, comprising:
   storing conference information including a teleconference participant condition for each of the plurality of conference rooms included in the teleconference and expected person identification information of expected participants assigned to each conference room for the teleconference to be held;
   determining, by a computer having processing circuitry, whether the teleconference satisfies a conference start condition based on each participant condition and a comparison of the expected person identification information included in the conference information and person identification information for each conference room, wherein the determining further comprises determining that the conference start condition has been satisfied in response to the participant condition for each of the plurality of conference rooms being satisfied, and determining at a conference start time, whether another conference room satisfies the participant condition in place of a conference room in the teleconference that does not satisfy conditions for participation in the teleconference; and
   connecting teleconference apparatuses used for the teleconference when the teleconference is determined to satisfy the conference start condition,
   wherein the participant condition for each of the plurality of conference rooms includes one of
   1) a condition which is satisfied when each person in the expected person identification information included in the conference information is matched to each person in the person identification information,
   2) a condition which is satisfied when at least one person in the expected person identification information included in the conference information is matched to persons in the person identification information, and
   3) a condition which is satisfied when an expected number of, or a proportion of the expect number of, persons in the expected person identification information included in the conference information is matched to persons in the person identification information, and
   wherein the participant condition is individually set for each of the plurality of conference rooms.

* * * * *